June 5, 1923.

C. OHLER

PISTON RING

Filed Nov. 22, 1921

1,458,072

Chester Ohler
INVENTOR

BY Victor J. Evans
ATTORNEY

WITNESS:

Patented June 5, 1923.

1,458,072

UNITED STATES PATENT OFFICE.

CHESTER OHLER, OF SUGAR CREEK, MISSOURI.

PISTON RING.

Application filed November 22, 1921. Serial No. 516,957.

*To all whom it may concern:*

Be it known that I, CHESTER OHLER, a citizen of the United States, residing at Sugar Creek, in the county of Jackson and State of Missouri, have invented new and useful Improvements in Piston Rings, of which the following is a specification.

This invention comprehends improvements in piston rings, and provides a ring made up of three parts or sections which are related to one another in a manner so that the outer periphery of the respective rings are arranged to contact the wall of the cylinder, and thus prevent any danger of the sections of said ring from injuring the wall of the cylinder incident to wedging or sticking, as is frequently the case where the intermediate section of a three part ring is not arranged to contact the wall of the cylinder.

Another object of the invention resides in the provision of a ring of the above mentioned character, wherein one of the ring sections is provided with an annular groove which serves to properly lubricate the ring as well as the wall of the cylinder, and at the same time forms a seal to prevent the loss of compression, or the passage of oil beyond the piston.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views and wherein:—

Figure 1:
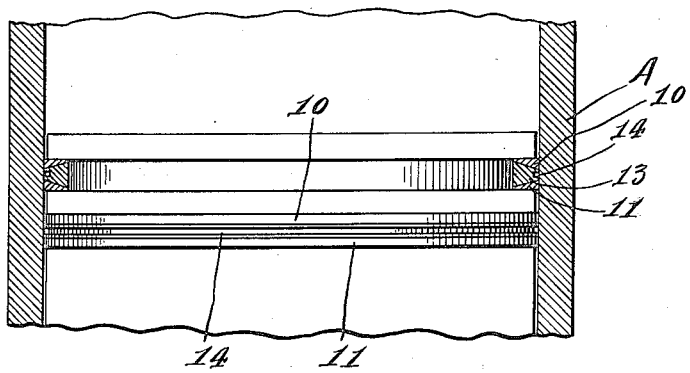
Figure 1 is a sectional view through a cylinder, showing a piston arranged therein equipped with the ring forming the subject matter of the invention, and showing all sections of the ring in contact with the wall of the cylinder.
Figure 2:
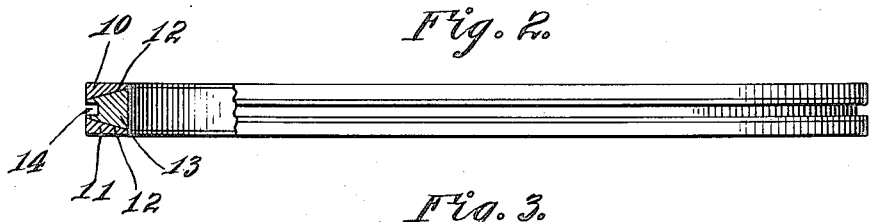
Figure 2 is an edge view of the ring partly in section.
Figure 3:
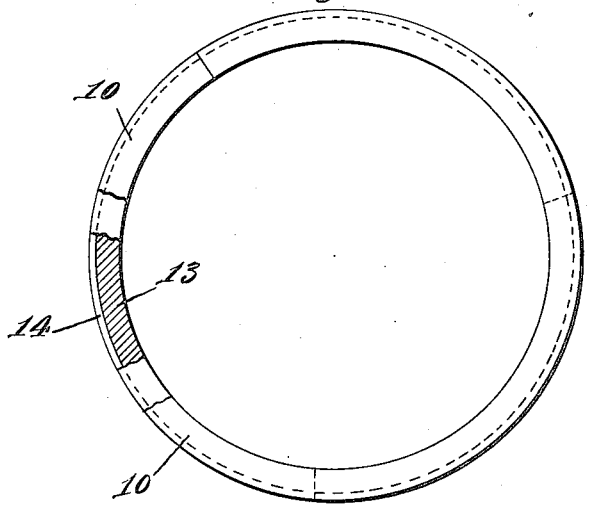
Figure 3 is a sectional view taken on line 3—3 of Figure 2.

The ring forming the subject matter of the present invention is made up of two outer sections indicated at 10 and 11 respectively, these sections having their inner or opposed faces beveled as at 12. Arranged between the sections 10 and 11 is an intermediate wedge shaped section 13 which is designed to fit between the sections 10 and 11 in a manner so that all of the outer peripheries of said section are disposed in the same plane so as to fully contact the wall of the cylinder A as illustrated in Figure 1. By reason of this construction and arrangement of parts, the danger of any one or more of the sections of the ring scoring the cylinder incident to sticking or wedging against the wall of the latter is obviated. The intermediate wedge shaped section 13 is larger and considerably heavier than the sections 10 and 11, and constitutes the main body portion of the ring, and while made from any suitable material is preferably constructed of cast iron to stand the intense heat to which such rings are subjected. The sections are split to provide for the necessary expansion, while the relation of the section one with the other is such as to eliminate any unnecessary friction in the grooves of the piston B or against the wall of the cylinder A.

In carrying out the invention, I provide the intermediate section 13 with an annular groove 14 which constitutes a means for properly lubricating the sections of the ring and the wall of the cylinder, at the same time preventing the oil from working past the piston, and constituting a seal to prevent the escape of compression. The ring in its entirety is very simple in construction, and can be manufactured and sold at a very nominal cost.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

A piston ring of the character described comprising a body section wedge shaped in cross section and having its inner periphery of greater width than the outer, an upper and lower section having their opposed faces beveled to converge outwardly and designed to engage the inclined faces of said body section in a manner so that the outer periphery of the body section and upper and lower sections are all disposed in the same plane, the body section being heavier and larger than the upper and lower section and having its small periphery provided with an annular groove for the purpose specified.

In testimony whereof I affix my signature.

CHESTER OHLER.